S. GRIFFIN.
Land-Leveler.

No. 206,943.    Patented Aug. 13, 1878.

Witnesses.                Inventor.

UNITED STATES PATENT OFFICE.

SETH GRIFFIN, OF ELYRIA, OHIO.

IMPROVEMENT IN LAND-LEVELERS.

Specification forming part of Letters Patent No. 206,943, dated August 13, 1878; application filed January 21, 1878.

*To all whom it may concern:*

Be it known that I, SETH GRIFFIN, of Elyria, in the county of Lorain and State of Ohio, have invented a certain new and Improved Land-Leveler, &c.; and I do hereby declare that the following is a full, clear, and complete description thereof, reference being had to the accompanying drawings, making a part of the same.

Figure 1:
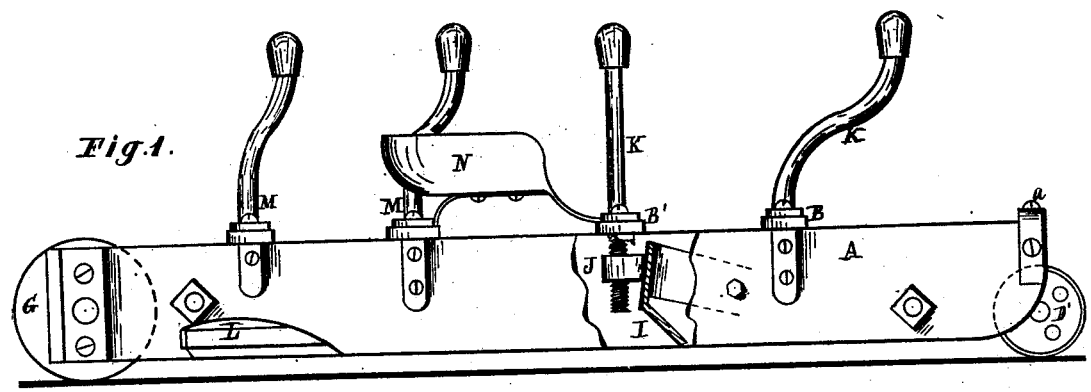
Figure 2:
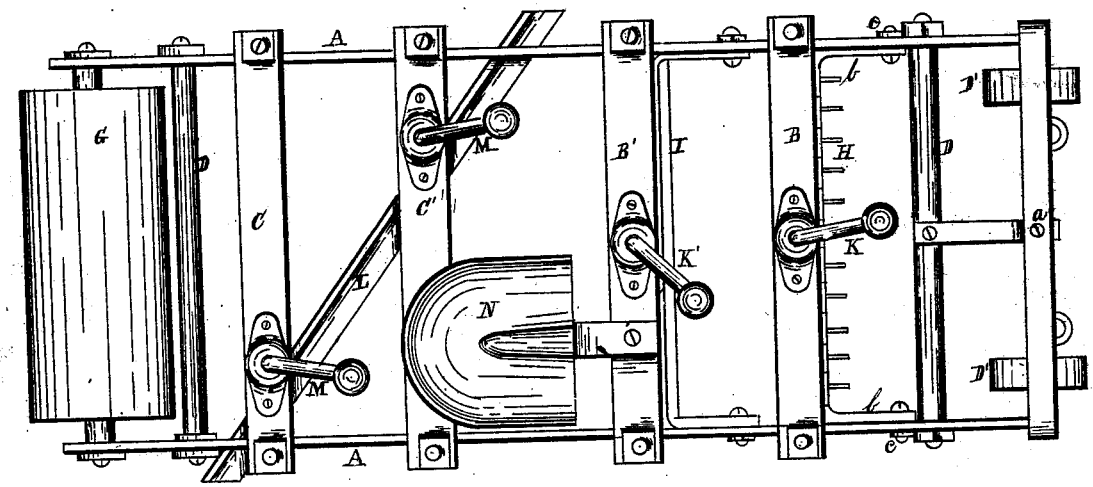
Figure 3:
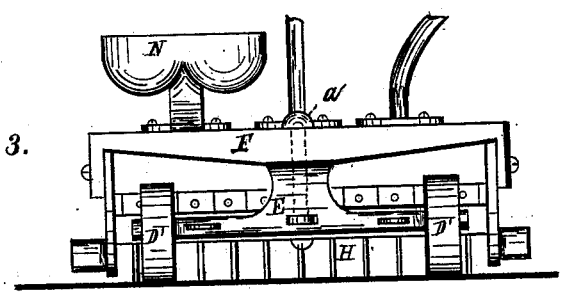

Figure 1 is a side view of the land-leveler, harrow, &c. Fig. 2 is a plan view. Fig. 3 is a front-end view.

Like letters of reference refer to like parts in the several views.

The nature of this invention relates to a machine for preparing land for seeding, and for grading and leveling roads, race-courses, &c.; and consists of a transverse and a diagonal scraper and rake, arranged in a suitable frame, and which, by certain screws, may be adjusted to run in the ground at variable depths, as may be required. In said frame is also a roller, arranged to co-operate with the scrapers and rake, all of which are constructed and operated as follows:

The sides of the frame alluded to consist of a pair of runners, A, either of wood or metal, and which are connected to each other by cross-beams B C and braces D. The front end of the runners is supported on a pair of wheels, D', on the axle E, and secured to the cross-piece F, Fig. 3, by a king-bolt, a, whereby the axle and wheels are allowed a horizontal rotatory movement for directing and turning the machine. This may be done, however, by one or more rollers or wheels arranged in essentially the same way. The rear end of the frame or runners is supported on a roller, G, journaled therein in any suitable way.

Under the front beam, B, is arranged a rake, H, Figs. 2 and 3, the ends or arms b of which are pivoted at c to the sides or runners, whereas the back of the rake is attached by a nut and adjusting-screw, K, to the beam B, substantially as the transverse scraper I, Figs. 1 and 2, is attached to the beam B' by the nut and adjusting-screw K'.

The mode of attachment will be readily understood on examination of Fig. 1, in which a portion of the runner is shown as broken away that the nut and adjusting-screw may be seen.

L, Fig. 2, is a scraper arranged diagonally in the frame, and suspended from the beams C' C' by nuts and adjusting-screws M, substantially as the back of the scraper L is shown attached to the beam B' in Fig. 1. Said rake and scrapers, by means of the adjusting-screws, can be raised or lowered, thereby causing them to vary their relation of distance in respect to the ground.

By means of the adjusting-screws M M either end of the scraper L may be raised or lowered independent of the other end, which will admit of the machine to cut or take up more earth on one side than on the other, so as to grade or scrape the road-crowning in the center.

The operation of the above machine is practically as follows: The operator takes his place on the seat N, and as the machine moves forward in the line of work the rake harrows down the uneven ground. The hollows that may not have been filled up and the knolls left unleveled by the rake are now filled up and leveled by the scraper I, which, for that purpose, may be screwed upward or lowered by the operator, as the condition of the ground may require, while the machine is moving forward. The ground thus harrowed over by the rake and leveled by the scraper is rolled down by the roller G, whereby the unbroken lumps are crushed and the ground left level and smooth for planting.

It will be obvious that both the rake and scraper can be made to enter the ground more or less deep for heavy or light work by means of the adjusting-screws, by which they may be set at the desired depth on starting the machine, and also adjusted to the nature of the ground by the operator while moving along.

Ordinarily the diagonal scraper may not be needed for field-work, and therefore it can be screwed up out of the way. Said diagonal scraper is more especially intended for road-work, for which purpose the machine is equally well adapted.

In grading and leveling roads, race-courses, &c., the diagonal scraper L carries the dirt toward the middle of the road, making it higher there, or crowning. To this end the machine is worked along on the one side of the road, throwing the dirt along the center, and returning upon the other side, leaving the roadway crowning and pressed down by the roller.

For road use, the machine may be made about one-half the width of the road, more or less, that the scraping may be done in both directions. For field-work, the width of the machine is not so essential.

The truck-wheels in front of the machine enable it to turn around easily, and be more readily guided in the line of work than it could be without them.

I am aware that rollers and scrapers have been used in various ways; but what distinguishes my improvement is the construction and arrangement herein described.

What I claim as my invention, and desire to secure by Letters Patent, is—

1. The rake H and scraper I, pivoted or hinged to the sides A of the machine, and attached to the beams B and B', respectively, by nuts J and adjusting-screws K and K', substantially as described.

2. The combination of the roller G, diagonal scraper L, transverse scraper I, rake H, wheels D', sides or runners A, and beams, constructed and arranged substantially as herein set forth, and for the purposes specified.

3. An improvement in land-levelers, consisting of the diagonal scraper L, attached to and suspended from the beams C C', between the sides, by means of adjusting-screws M, respectively depending from each beam, in combination with one or more rollers preceding and following the said scraper, constructed and arranged substantially as and for the purpose set forth.

SETH GRIFFIN.

Witnesses:
W. H. BURRIDGE,
L. O. DEHNEL.